United States Patent
Reineke et al.

(10) Patent No.: US 11,842,179 B2
(45) Date of Patent: Dec. 12, 2023

(54) SYSTEM FOR AUTOMATICALLY GENERATING CUSTOMER SPECIFIC DATA CENTER APPLICATION PROGRAM INTERFACES

(71) Applicant: Dell Products L.P., Round Rock, TX (US)

(72) Inventors: Nicole Reineke, Northborough, MA (US); Hanna Yehuda, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 17/571,263

(22) Filed: Jan. 7, 2022

(65) Prior Publication Data

US 2023/0221933 A1    Jul. 13, 2023

(51) Int. Cl.
| | |
|---|---|
| G06F 9/44 | (2018.01) |
| G06F 8/60 | (2018.01) |
| G06F 9/54 | (2006.01) |
| G06F 11/34 | (2006.01) |
| G06F 11/30 | (2006.01) |

(52) U.S. Cl.
CPC ............. *G06F 8/60* (2013.01); *G06F 9/547* (2013.01); *G06F 11/3006* (2013.01); *G06F 11/3438* (2013.01)

(58) Field of Classification Search
None
See application file for complete search history.

(56) References Cited

U.S. PATENT DOCUMENTS

| | | | |
|---|---|---|---|
| 7,945,902 | B1 | 5/2011 | Sahoo |
| 8,447,569 | B1 * | 5/2013 | Marwah ............ G06F 11/3409 |
| | | | 702/179 |
| 9,619,649 | B1 | 4/2017 | Yun |
| 10,782,990 | B1 | 9/2020 | Suarez et al. |
| 2005/0033600 | A1 | 2/2005 | Geddes et al. |
| 2005/0278202 | A1 | 12/2005 | Broomhall et al. |
| 2006/0235778 | A1 | 10/2006 | Razvi et al. |
| 2007/0288286 | A1 | 12/2007 | Linehan |
| 2009/0307094 | A1 * | 12/2009 | Manos .................... G06F 8/10 |
| | | | 717/177 |
| 2010/0250298 | A1 | 9/2010 | Channabasavaiah et al. |
| 2010/0274639 | A1 | 10/2010 | Tsuji et al. |
| 2011/0087522 | A1 | 4/2011 | Beaty et al. |

(Continued)

OTHER PUBLICATIONS

List of Patents or Applications Treated as Related, Oct. 2022.

(Continued)

*Primary Examiner* — Qamrun Nahar

(57) ABSTRACT

A system, method, and computer-readable medium are disclosed for performing a data center monitoring and management operation. The data center monitoring and management operation includes: monitoring an interaction of a user with a data center monitoring and management console when configurating an aspect of data center infrastructure, the configuring being performed via a plurality of application program interfaces; analyzing the plurality of application program interfaces used when configuring the aspect of data center infrastructure; and, generating a customer specific application program interface based upon the analyzing.

20 Claims, 8 Drawing Sheets

(56) References Cited

U.S. PATENT DOCUMENTS

| | | |
|---|---|---|
| 2011/0313808 A1 | 12/2011 | Kavanagh et al. |
| 2013/0275263 A1 | 10/2013 | Carlin, Jr. et al. |
| 2013/0290932 A1* | 10/2013 | Kruglick ............ G06F 11/3676 |
| | | 717/124 |
| 2014/0052500 A1 | 2/2014 | Vallapuzha et al. |
| 2014/0068073 A1 | 3/2014 | Peles et al. |
| 2014/0095263 A1 | 4/2014 | McAlister et al. |
| 2014/0172678 A1 | 6/2014 | Stephens et al. |
| 2015/0006260 A1 | 1/2015 | Harris |
| 2015/0332185 A1 | 11/2015 | Zakkam et al. |
| 2015/0350174 A1 | 12/2015 | Reno et al. |
| 2015/0350234 A1 | 12/2015 | Reno et al. |
| 2015/0358207 A1 | 12/2015 | Baldock et al. |
| 2016/0019489 A1 | 1/2016 | Bergmann et al. |
| 2016/0080422 A1 | 3/2016 | Belgodere et al. |
| 2016/0380862 A1 | 12/2016 | Shapsa et al. |
| 2017/0006410 A1 | 1/2017 | Barrett et al. |
| 2017/0230251 A1 | 8/2017 | Dube et al. |
| 2018/0005121 A1 | 1/2018 | Hoque et al. |
| 2018/0285997 A1 | 10/2018 | Bostick et al. |
| 2018/0300793 A1 | 10/2018 | Chen et al. |
| 2018/0349101 A1 | 12/2018 | Lyras et al. |
| 2019/0095814 A1 | 3/2019 | Dubovsky et al. |
| 2019/0213061 A1* | 7/2019 | Campos-Guajardo .... G06F 8/33 |
| 2019/0243968 A1 | 8/2019 | Gordeychik et al. |
| 2019/0268233 A1 | 8/2019 | Singh |
| 2020/0026851 A1 | 1/2020 | Dhanka et al. |
| 2020/0159638 A1 | 5/2020 | Gupta et al. |
| 2020/0371896 A1 | 11/2020 | Mathur et al. |
| 2021/0027401 A1 | 1/2021 | Hovhannisyan et al. |
| 2021/0133670 A1 | 5/2021 | Cella et al. |
| 2021/0240551 A1* | 8/2021 | Joyce .................. G06F 11/302 |
| 2021/0390562 A1 | 12/2021 | Reznic et al. |
| 2022/0012105 A1 | 1/2022 | Chagam Reddy |
| 2022/0078072 A1 | 3/2022 | Rayes et al. |
| 2022/0247635 A1 | 8/2022 | Guim Bernat et al. |
| 2022/0414576 A1 | 12/2022 | Reineke et al. |

OTHER PUBLICATIONS

List of Patents or Applications Treated as Related, Aug. 2022.

Sunitha Abburu et al., Ontology Storage Models and Tools: An Authentic Survey, J. Intell. Syst. 2016; 25(4): 539-553, https://www.degruyter.com/document/doi/10.1515/jisys-2014-0167/html, published online Aug. 22, 2015.

Behi et al., Consumer Engagement in Virtual Power Plants through Gamification, 2020 5th International Conference on Power and Renewable Energy (ICPRE), Shanghai, China, 2020, pp. 131-137, doi: 10.1109/ICPRE51194.2020.9233110, pp. 131-133 (Year: 2020).

* cited by examiner

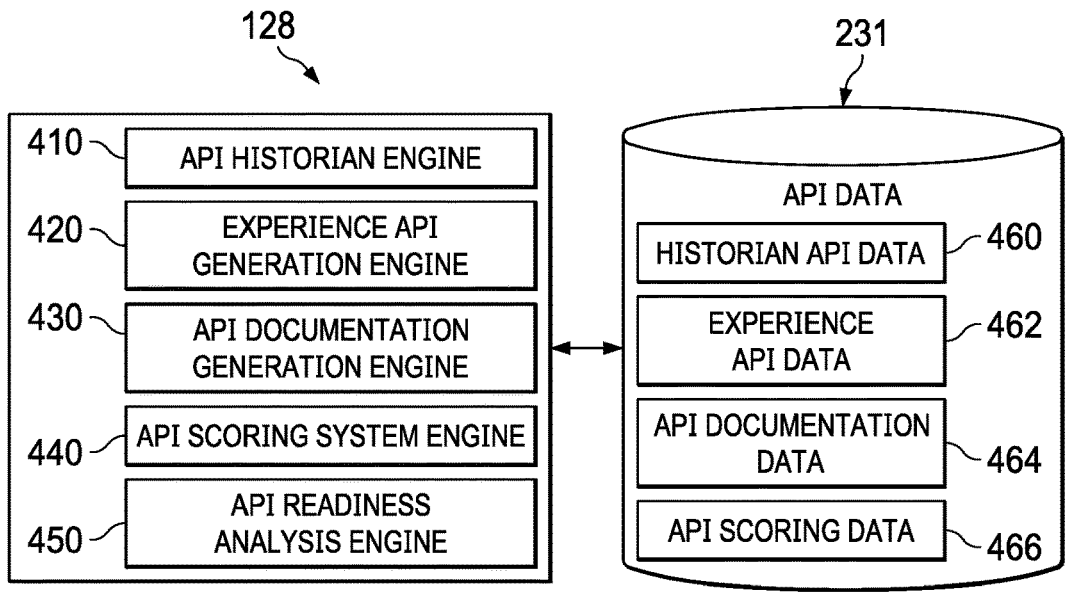

FIG. 4

Solution:
By tracing the calls done in the GUI, and ingesting existing GitOps scripts, we can create a historical record of API calls that are done by a company, including their used parameters. We achieve this by creating an API Experience datastore that lives alongside the IaC orchestration system. The datastore contains at a minimum:

| 500 | API DATASTORE |
| --- | --- |
|  | API EXPERIENCE DATASTORE |
| 510 | API (APIID_PK, array[API_Call_FK], API Description, OntologyID_FK) |
| 520 | API_Call (API_Call_PK, parameters(Array), dataoutput, description, versionID) |
| 530 | API Access Historian (API_Call_VersionID_PK, OrgID_FK, User_FK, APIWorkflow_Array(API_Call_VersionID_FK), datetimestamp) |
| 540 | Organization (OrgID_PK, Industry, Arrays [UserID, API_FK owned APIs, API_Call_Ver_FK versions of an API call that are approved for use]) |
| 550 | ExperienceAPI_Call (ExperienceAPI_PK, ExperienceAPI_CommonName, ExperienceAPI details, Experience_API_Version, ExperienceAPI_CallArray, OrgID_FK, UserID_fk) |

FIG. 5

Default Complexity rules– established the standard rules for the IaC/Cloud/APEX API categorization. One example is additive:
- Low complexity – API Call score 75+
- Medium Complexity API call score 40-74
- High complexity API call score <40

Sample rule:
- If API_call exists in Ontology +25
- For API_Call parameters, + (25 - Number of parameters)
- For API_call Size of data output, + (25 – lines returned)
- For API_call_workflow, + (25 – average number of prior calls average number of post calls)
- In this case, and API call that is a member of an ontology with 5 parameters and a 5 line output that can be used without prior or following calls would have a score of 90. (low complexity)

Complexity service – triggered on API updates, updates the APII data store with API_Call_complexity Score

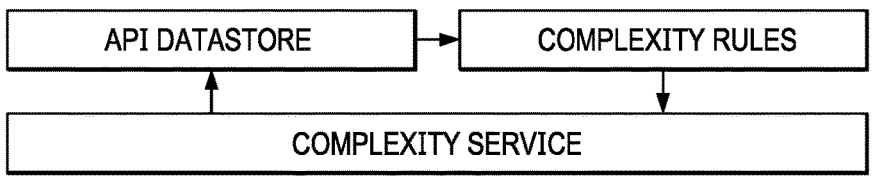

FIG. 10

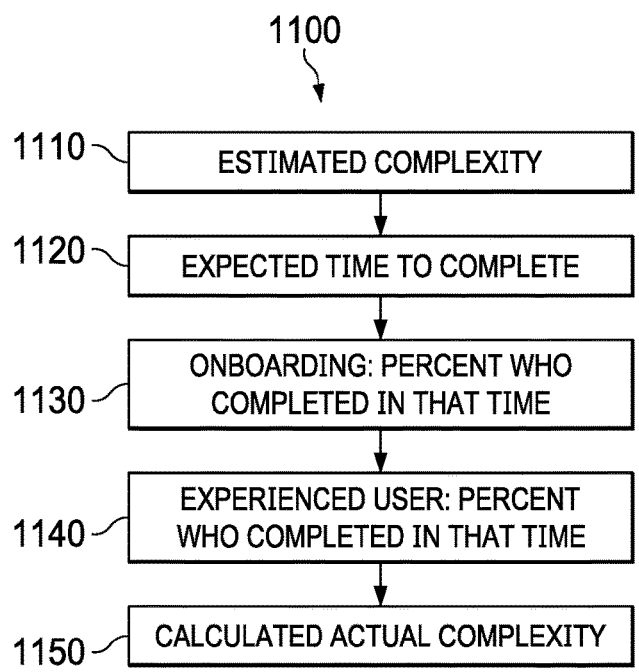

FIG. 11

SYSTEM FOR AUTOMATICALLY GENERATING CUSTOMER SPECIFIC DATA CENTER APPLICATION PROGRAM INTERFACES

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: monitoring an interaction of a user with a data center monitoring and management console when configurating an aspect of data center infrastructure, the configuring being performed via a plurality of application program interfaces; analyzing the plurality of application program interfaces used when configuring the aspect of data center infrastructure; and, generating a customer specific application program interface based upon the analyzing.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring an interaction of a user with a data center monitoring and management console when configurating an aspect of data center infrastructure, the configuring being performed via a plurality of application program interfaces; analyzing the plurality of application program interfaces used when configuring the aspect of data center infrastructure; and, generating a customer specific application program interface based upon the analyzing.

In another embodiment the invention relates to a computer-readable storage medium embodying computer program code, the computer program code comprising computer executable instructions configured for: monitoring an interaction of a user with a data center monitoring and management console when configurating an aspect of data center infrastructure, the configuring being performed via a plurality of application program interfaces; analyzing the plurality of application program interfaces used when configuring the aspect of data center infrastructure; and, generating a customer specific application program interface based upon the analyzing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows a simplified block diagram of a data center application program interface management system.

FIG. 5 shows a block diagram of customer experience application program interface data structure.

FIG. 10 shows a flow chart of the operation of an application program interface scoring operation.

FIG. 11 shows a block diagram of an example use case of an application program interface scoring operation.

DETAILED DESCRIPTION

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
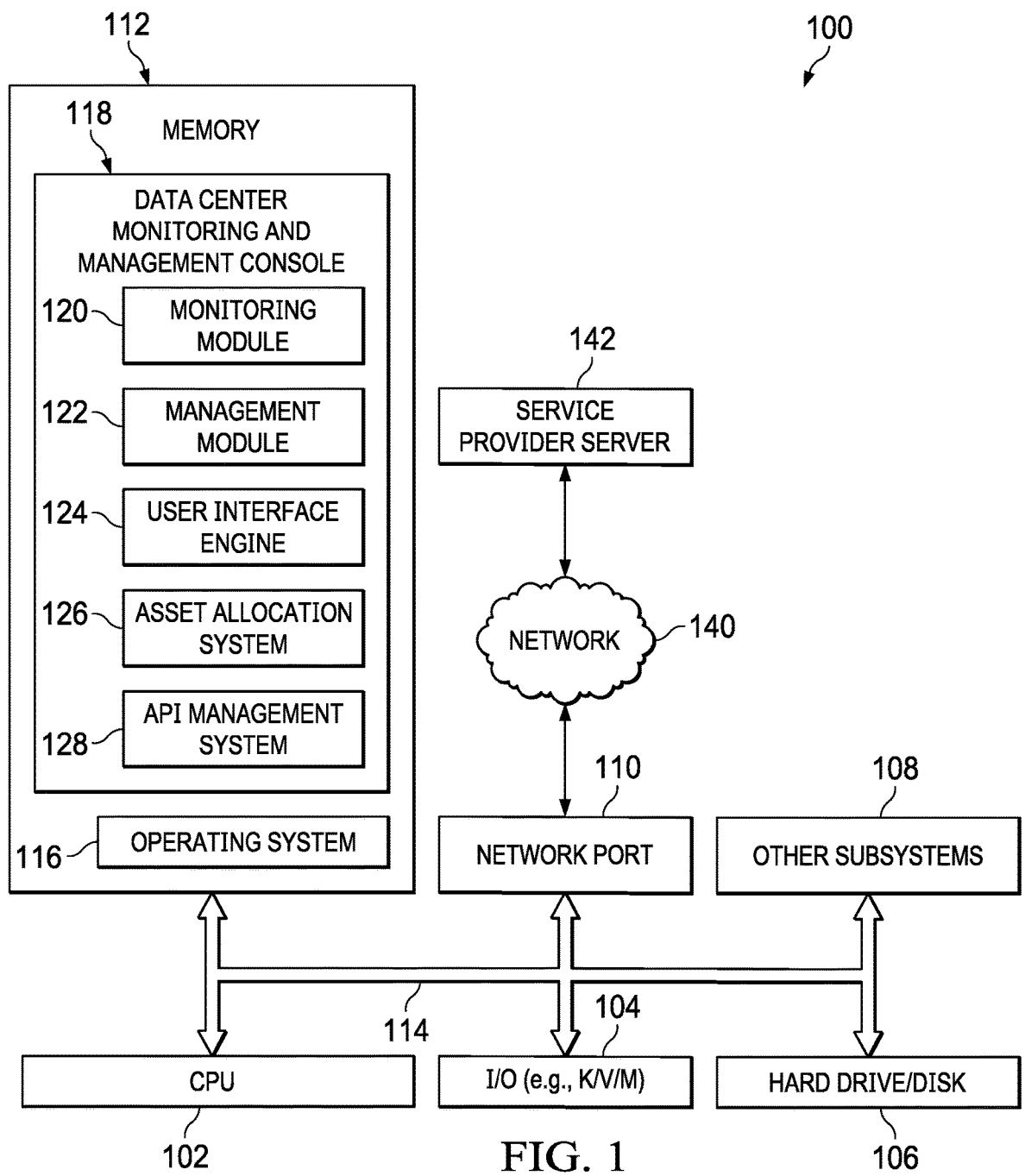
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, a user interface engine 124, an asset allocation engine 126, and an application program interface management engine 128, or a combination thereof. In certain embodiments, the data center monitoring and management console 118 may be implemented to perform a data center monitoring and management operation. It will be appreciated that the data center monitoring and management operation may be applied to on-premises IT environments, cloud environments or a combination thereof. In certain embodiments, the data center monitoring and management operation includes an application program interface management operation, as described herein. In certain embodiments, the application program interface management operation includes one or more of an API historian operation, an experience API generation operation, an API documentation operation, an API scoring operation and an API readiness operation, as described herein. In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the application program interface management engine 128 performs an application program interface management operation which facilitates management of one or more aspects of an application program interface. In certain embodiments, the application program interfaces include an experience application program interface. It will be appreciated that performance of the application program interface management operation automates generation of an experience application program interface.

As used herein, an application program interface (API) refers to a software interface which provides a connection between an information handling system, such as a data center asset or data center software, and a programming language, software library, operating system or hardware associated with the information handling system. In certain embodiments, an application program interface specification includes documentation that describes how to build or use an application program interface. In various embodiments, an application program interface hides internal details of how a system works and exposes parts of the workings of a particular aspect of the programming language, software library, operating system or hardware associated with the information handling system that a programmer or IT technician might find useful when configuring a particular aspect of the programming language, software library, operating system or hardware associated with the information handling system. In various embodiments, an application program interface is associated with a software library where the application program interface describes and prescribes a set of parameters (also referred to as rules) (e.g., via an API specification) while the library includes actual implementations for each of the parameters within the set of parameters.

Figure 2:
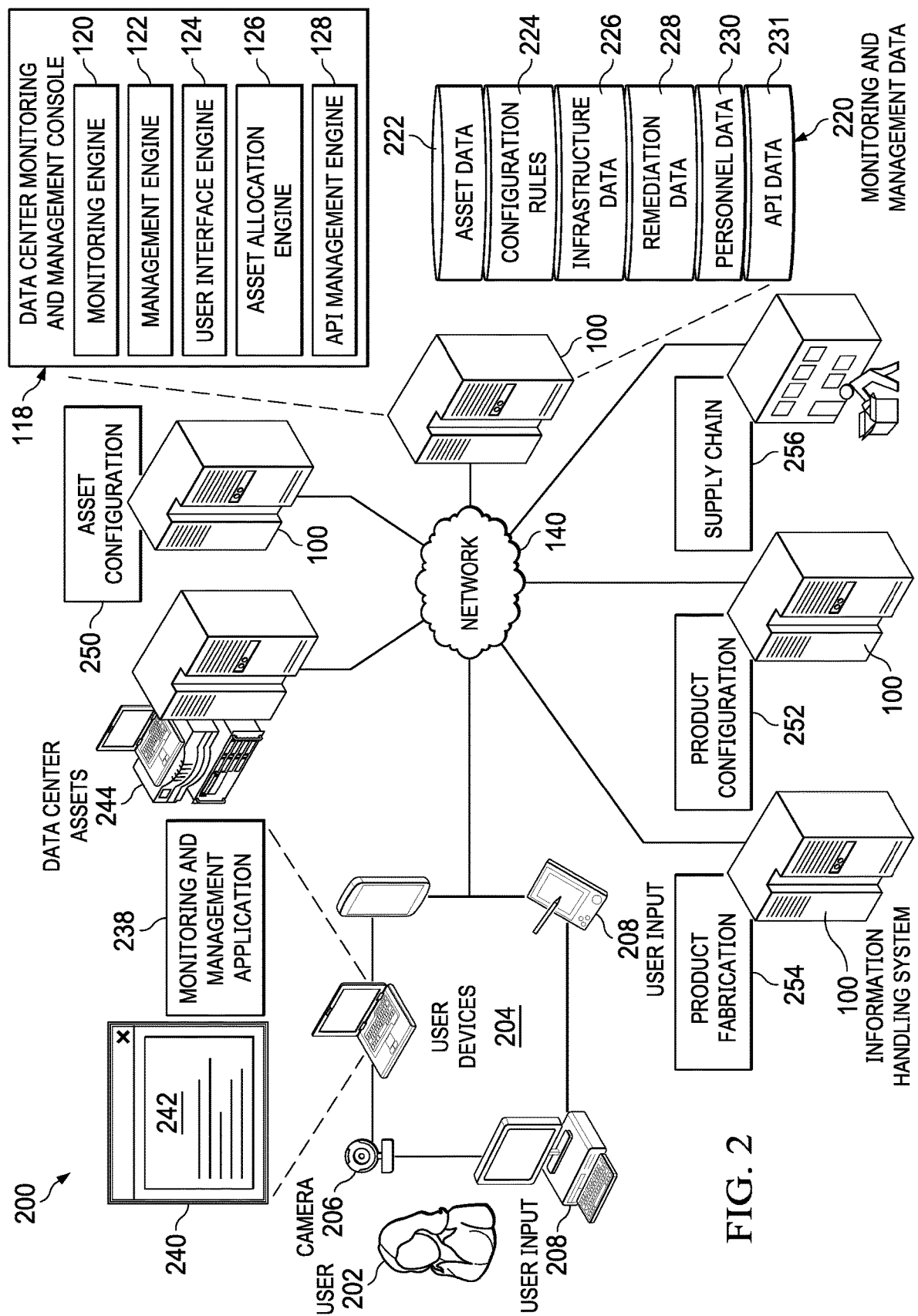
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, software or a service, or a combination thereof.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244. As used herein, configuring an aspect of data center infrastructure broadly refers to any task, function, procedure, or process performed, directly or indirectly, within a data center monitoring and management environment 200 to procure, deploy, configure, implement, operate, monitor, manage, maintain, or remediate one or more data center assets.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain information associated with the operation of a particular data center asset 244. In certain embodiments, such operational information may be received through the use of telemetry approaches familiar to those of skill in the art. In various embodiments, the data center monitoring console 118 may be implemented to process certain operational information received from a particular data center asset to determine whether a data center issue has occurred, is occurring, or is anticipated to occur.

In certain embodiments, the data center monitoring and management console 118 may be implemented to include a monitoring module 120, a management monitor 122, a user interface (UI) engine 124, an asset allocation engine 126, and an application program interface management engine 128, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244. In various embodiments, the asset allocation engine 126 may be implemented to perform a tangible data center asset allocation operation, described in greater detail herein. In various embodiments, the application program interface management engine 128 may be implemented to perform an application program interface management operation, described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, data center personnel data 230 and data center application program interface data 231.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 222 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

Data center application program interface data 231, as used herein, broadly refers to any data associated with data center application program interfaces which may be directly, or indirectly, involved in the procurement, deployment, configuration, implementation, operation, monitoring, management, maintenance, or remediation of a particular data center asset 244. In various embodiments, the data center application program interface data 231 may include API data, API call data, API access historian data, organization data, experience API call data, API documentation data and API scoring data.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. It will be appreciated that the data center monitoring and management application may be applied to various types of IT environments including data centers, cloud ecosystems and multi-domain monitoring, or any combination thereof. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Various aspects of the present disclosure include an appreciation that IT technicians, such as software engineers, are consuming infrastructure, such as data center infrastructure, directly to have a fully code-only experience. Various aspects of the present disclosure include an appreciation that a workflow associated with the consumption of the infrastructure includes execution of one or more application program interfaces. Various aspects of the present disclosure include an appreciation that it would be desirable to shorten workflows associated with the consumption of the infrastructure. Various aspects of the present disclosure include an appreciation that because application program interfaces are generally built to work universally across data center infrastructures, the application program interfaces are often very detailed to provide all options regarding a data center infrastructure to a plurality of customers. Various aspects of the present disclosure include an appreciation that manually managing application program interfaces can be an arduous and difficult task as no single high level workflow is universally application. Additionally, various aspects of the present disclosure include an appreciation that assigning developers to manage application program interfaces for individual customers is difficult to scale due to the large number of different customers and different customer requirements.

It will be appreciated that simplification of application program interface management can be of great value to certain customers. In various embodiments, the application program interface management operation, described in greater detail herein, allows identification and generation of experience application program interfaces that are individualized for a particular customer to provide an idealized customer experience. In various embodiments, the application program interface management operation automatically combines aspects of a plurality of application program interfaces to achieve a predefined objective, thereby shortening a workflow. In various embodiments, the predefined objective can include configuration of an aspect of data center infrastructure and the aspects can be various application program functionality, including application program interface parameters, input parameters and output parameters from a plurality of application program interfaces for achieving the predefined objective. In various embodiments, the combination of the plurality of application program interfaces is individualized for a particular customer. In various embodiments, the combination of the plurality of application program interfaces is individualized for a particular user of a particular customer.

In certain embodiments, the application program interface management operation captures an application program interface sequence for a particular workflow. In certain embodiments, the application program interface sequence includes functional aspects from a plurality of application program interfaces. In certain embodiments, the functional aspects include API call combinations, including API input parameters and API output parameters. In certain embodiments, the application program interface sequence is captured via one or more of user interface monitoring and script ingestion. In certain embodiments, the application program interface sequence is captured via one or more of a software development and version control system such as Github, a software development and IT operations system such as DevOps or a technical operations system such as TechOPs.

In certain embodiments, the application program interface management operation automatically establishes an experience application program interface that includes the functional aspects from the plurality of application program interfaces for a particular workflow. In certain embodiments, the experience application program interface is established for a particular customer. Various aspects of the present disclosure include an appreciation that such an experience application program interface is especially beneficial when non-IT personnel or non-traditional developers are generating application program interface based infrastructure consumption such as data center infrastructure consumption.

Various aspects of the present disclosure include an appreciation that when setting up new pipelines or infrastructure (such as infrastructure as a service), IT technicians such as IT operational personnel often prefer to use the easiest way to get started, which is typically via a graphical user interface GUI interface or by ingesting existing scripts. Once a developer has set up a few processes or pipelines, they often hand off the infrastructure access (for at least development and test) to software engineers directly.

Various aspects of the present disclosure include an appreciation that software engineers are often forced to dive through large API specifications to set up their code-based deployments and use of the infrastructure (commonly referred to as IaC or GitOps). As there are a very large combination of API calls, documentation does not have an effective way of showing which API calls should be called in which order. This issue can decrease the effectiveness of development teams through the increased learning curve, decreased accuracy, and introduction of errors in the new code or scripts.

In certain embodiments, the application program interface management operation includes an API documentation generation operation. In certain embodiments, the API documentation generation operation traces a user's interaction with a monitoring and management console and automatically generates a set of APIs that are used in which order by certain types of users. In certain embodiments, the user's interaction can be traced by the user's interaction with a user interface and/or any associated scripts. In certain embodiments, the API documentation generation operation stores interactions, such as UI interactions with the monitoring and management console 118 in the API datastore 231. In certain embodiments, the API documentation generation operation enables script ingestion. In certain embodiments, the interactions and the script ingestion are associated with the API calls made by each interaction or ingestion. An ordered list of API calls is then generated from the association and stored within the API datastore 231. The information that is stored can then be used to populate a documentation section with likely prior calls and likely next calls. The information that is stored can also be used to build a training order for modules based on the order of calls. This information can also be used to return a standard set of next likely calls for a particular API call which can be used to provide a prompt within a command line interface or to train a machine learning system to automate the selection of API calls. Accordingly, the API documentation generation operation derives API trees from traced steps specific to a single organization or user in a cloud deployment to build automated next likely and prior call lists for use in populating documentation, training, and API call returns. Such an operation advantageously reduces the training scope and time to value for developers.

Various aspects of the present disclosure include an appreciation that that existing application program interface management operation fail to provide clear indicators on for whom an API is meant, and how easy or difficult an API is to use, and therefore make it difficult to automate any display information based on for which persona an API (or API call) is best suited. Various aspects of the present disclosure include an appreciation that without a means of measuring an API complexity developers may select an incorrect API call or complexity of API which can lead to a negative development experience, as a user interface designed it can be difficult to establish clear API displays for newer developers versus solution architects versus senior developers, it is difficult to automate categorization of APIs for display automation, which can be especially important in a cloud provider environment such as when infrastructure is provided as a service (IaaS).

In certain embodiments, an API management operation includes an API complexity scoring operation. In certain embodiments, the API complexity scoring operation generates an API complexity score based upon a plurality of aspects of the API. In certain embodiments, the plurality of aspects of the API include one or more of the existence of the API call in an API ontology, a number of parameters used by the API, a size of data output of the API and a place in a workflow of the API. As used herein, an API ontology refers to a common method of communicating information regarding an API. In certain embodiments, the information regarding the API can include a formal explicit specification of the API. In certain embodiments, the API ontology provides one or more of domain vocabulary, domain knowledge, common understanding, shareability, information interoperability, reusability, concept hierarchy, and relationships that support semantic information retrieval. In certain embodiments, the API complexity score can be supplemented with organizational complexity rules to enable each organization to define their own version of complexity. In certain embodiments, the API complexity score can use customer feedback to modify a score and the help identify opportunities for improvement for the API.

Figure 3:
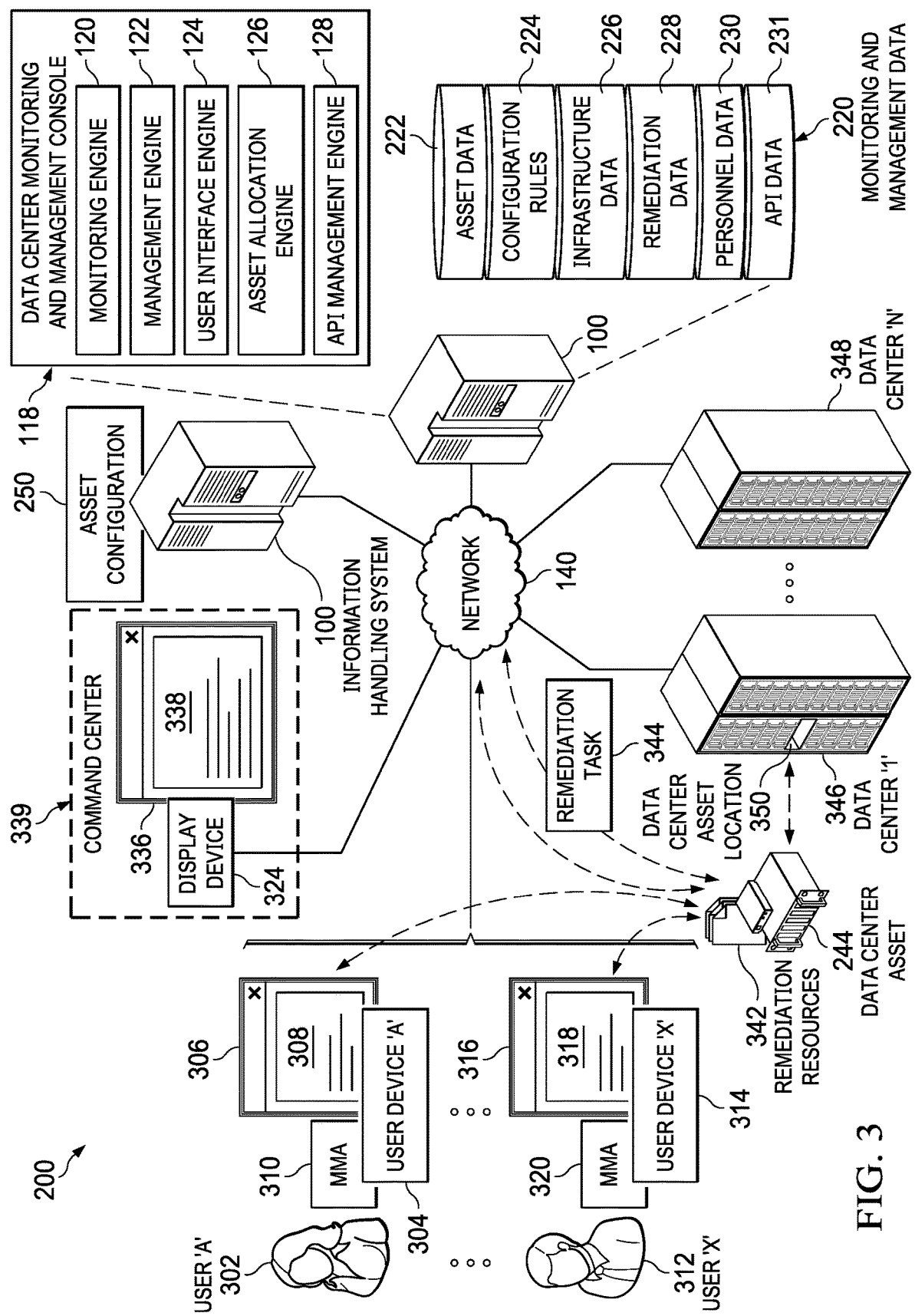
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, a user interface (UI) engine 124, an asset allocation engine 126, and an application program interface management engine 128, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 339, familiar to those of skill in the art, such as a command center 339 typically found in a data center or a network operations center (NOC). In various embodiments, one or more of the users 'A' 302 through 'x' 312 may be located within the command center 339. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244 in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 339 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

FIG. 4 shows a simplified block diagram of a data center application program interface management system environment 400. In various embodiments, the data center application program interface management system environment 400 includes the data center application program interface system 128 and the API data repository 231. In various embodiments, the data center application program interface management system 400 includes one or more of an API historian engine 410, an experience API generation engine 420, an API documentation engine 430, an API scoring engine 440 and an API readiness analysis engine 450. In various embodiments, one or more of the API historian engine 410, the experience API generation engine 420, the API documentation engine 430, the API scoring engine 440 and the API readiness analysis engine 450 interact with the API data repository.

In various embodiments, the API historian engine 410 performs an API historian operation. In various embodiments, the experience API generation engine 420 performs an experience API generation operation. In various embodiments, the API documentation engine 430 performs an API documentation generation operation. In various embodiments, the API scoring engine 440 performs an API scoring operation. In various embodiments, the API readiness analysis engine 450 performs an API readiness operation. In various embodiments, the API data repository 231 includes one or more of a historian API datastore 460, an experience API datastore 462, an API documentation datastore 644, and an API scoring datastore 466.

As used herein, an API historian operation broadly refers to any function, task, procedure, or process performed, directly or indirectly, within a data center monitoring and management environment 200 to monitor an interaction of a user with the data center monitoring and management console when configuring an aspect of data center infrastructure.

In various embodiments, some or all of the interaction include interactions with application program interfaces. As used herein, an experience API generation operation broadly refers to any function, task, procedure, or process performed, directly or indirectly, within a data center monitoring and management environment 200 to generate a customer specific application program interface. As used herein, an API documentation generation operation broadly refers to any function, task, procedure, or process performed, directly or indirectly, within a data center monitoring and management environment 200 to generate customer specific application program interface documentation. As used herein, an API scoring operation broadly refers to any function, task, procedure, or process performed, directly or indirectly, within a data center monitoring and management environment 200 to generate an application program interface complexity score for an associated application program interface. As used herein, an API readiness operation broadly refers to any function, task, procedure, or process performed, directly or indirectly, within a data center monitoring and management environment 200 to generate an application program interface readiness metric for an associated application program interface. In certain embodiments, the application program interface readiness metric provides an indication of whether an application program interface is ready for customer consumption.

FIG. 5 shows a block diagram of customer experience application program interface data structure 500. In various embodiments, the customer experience application program interface data structure 500 is stored within the experience API datastore 460. In various embodiments, the customer experience application program interface data structure 500 includes an API portion 510, an API call portion 520, an API access historian portion 530, an organization portion 540 and an experience API call portion 550. Throughout the data structure portions, primary key (PK) is a notation that is the table in which the object is created and foreign key (FK) is a notation that the identifier refers to an object which is managed in a different table (i.e., the foreign key refers to the other table's primary key).

In various embodiments, the API portion 510 includes one or more of an API ID array component (APIID_PK, array) which stores an array of API identifiers, an API description component (API Description) which stores description information regarding each API stored in the API ID array and an ontology component (OntologyID_FK) which stores information regarding the ontology of each API stored in the API ID array. As used herein, the ontology of an API provides information regarding a structure of a corresponding application program interface.

In various embodiments, the API call portion 520 includes one or more of an API call component (API_Call_PK) which stores API calls, a parameters component (parameters (Array) which stores the parameters of an API within an array, a data output component (dataoutput) which includes information regarding the output to be generated by a respective API, a description component (description) which stores description information regarding the respective API and a version identification component (versionID) which stores version information regarding the respective API.

In various embodiments, the API access historian portion 530 includes one or more of an API call version identification component (API_Call_VersionID_PK) which stores an API call version identifier, an organization identification component (OrgID_FK) which stores organization information regarding the corresponding API, a user component (User_FK) which stores user information regarding the corresponding API, an API workflow component (APIWorkflow_Array(API_Call_VersionID_FK)) which stores an array representing the workflow of the particular version of the application program interface and a timestamp component (datetimestamp) which stores a timestamp of the particular version of the application program interface when the workflow was captured.

In various embodiments, the organization portion 540 includes one or more of an organization identification component (OrgID_PK) which stores identification information associated with the organization, an industry component (Industry) which stores information regarding the industry of the organization and a plurality of organization specific arrays. In various embodiments, the organization specific arrays include one or more of a user identification array (UserID) which stores an array of user identifiers of users within the organization, an owned API component (API_FK owned APIs) which stores an array of APIs owned by the organization, an API call version component which stores an array of the versions of the APIs authorized for use by the organization.

In various embodiments, the experience API component 550 includes one or more of an experience API component (ExperienceAPI_PK) which stores an experience API, an experience API common name component (ExperienceAPI_CommonName) which stores a common name associated with the experience API, an experience API details component (ExperienceAPI_details) which stores details associated with the experience API, an experience API version component (Experience API Version) which stores version information regarding the experience API, an experience call array component (ExperienceAPI_CallArray) which stores an array of calls associated with the experience API, an organization identification component (OrgID_FK) which stores identification information associated with the organization associated with the experience API and a user identification component (UserID_FK) which store identification information associated with the user in the organization associated with the experience API.

Figure 6:
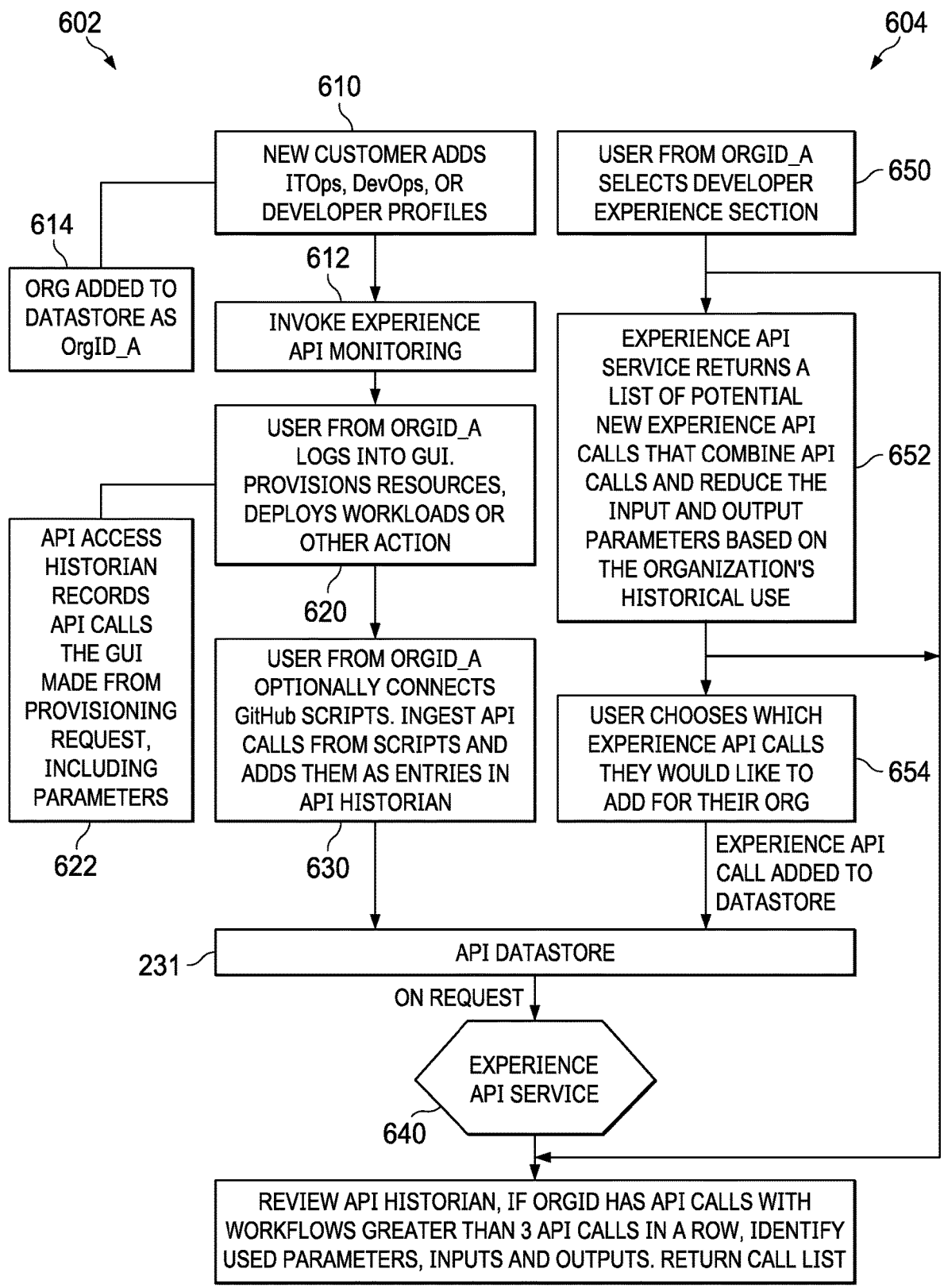
FIG. 6 shows a flow chart of the operation of a customer experience application program interface operation.

FIG. 6 shows a flow chart of the operation of a customer experience application program interface management operation 600. In certain embodiments, the customer experience application program interface management operation 600 includes an API recordation portion 602 and a customer experience API execution portion 604. In certain embodiments, the customer experience application program interface management operation 600 is associated with the API experience generation operation performed by the experience API generation engine 420.

The API recordation portion 602 of the customer experience application program interface management operation 600 begins at step 610 with a new customer adding a profile to be used in the process of configuring data center infrastructure such as that performed via the data center monitoring and management console 118 in combination with the asset configuration system 250. Next, the data center monitoring and management console 118 invokes an experience API monitoring operation at step 612. As used herein, an experience API monitoring operation includes one or more of monitoring an interaction of a user with a data center monitoring and management console when configuration an aspect of data center infrastructure via a plurality of application program interfaces and analyzing the plurality of application program interfaces used when configuring the data center infrastructure.

When the experience API monitoring operation is invoked, the organization identifier (OrgID_AK) for the new customer is added to the API datastore 231 at step 614. Next, at step 620 a user from the organization logs into a monitoring and management application, such as monitoring and management application 238 and performs an action, such a provisioning a resource or deploying a workload. Next, an API historian operation, such as the API historian operation perform by API historian engine 410 records any API calls the monitoring and management application made from the requested action, including input and output parameters at step 622. In certain embodiments, the API calls may be recorded to the API access historian portion 530 of the customer experience application program interface data structure 500.

Next at step 630, the user from the organization may optionally connect scripts, such as GitHub scripts to the data center monitoring and management console. The data center monitoring and management console can ingest the API calls from the scripts and adds the scripts as entries in the API access historian. After the API calls are recorded and any scripts are connected, an experience API service is called at step 640. In certain embodiments, the experience API service corresponds to the API management engine 128. The experience API service reviews the entries created by the API historian during performance of the action. If performance of the action resulted in a number of API calls greater than a predetermined number (e.g., three API calls in a row), then the experience API service generates an experience API using the parameters, inputs and outputs recorded by the historian. In certain embodiments, the experience API service generates a call list of the parameters, inputs and outputs. This experience API can then be stored within the API datastore 231.

The customer experience API execution portion 604 of the customer experience application program interface management operation 600 begins at step 650 with a user selecting a developer experience option in the monitoring and management application 238. Next, at step 652 the experience API service returns a list of potential new experience API calls based on the historical use of the data center monitoring and management console by the organization. In certain embodiments, the experience API calls combine API calls and reduce input and output parameters based upon the historical use by the organization. Next, at step 654 the user chooses which experience API calls they would like to add for their organization.

Figure 7:
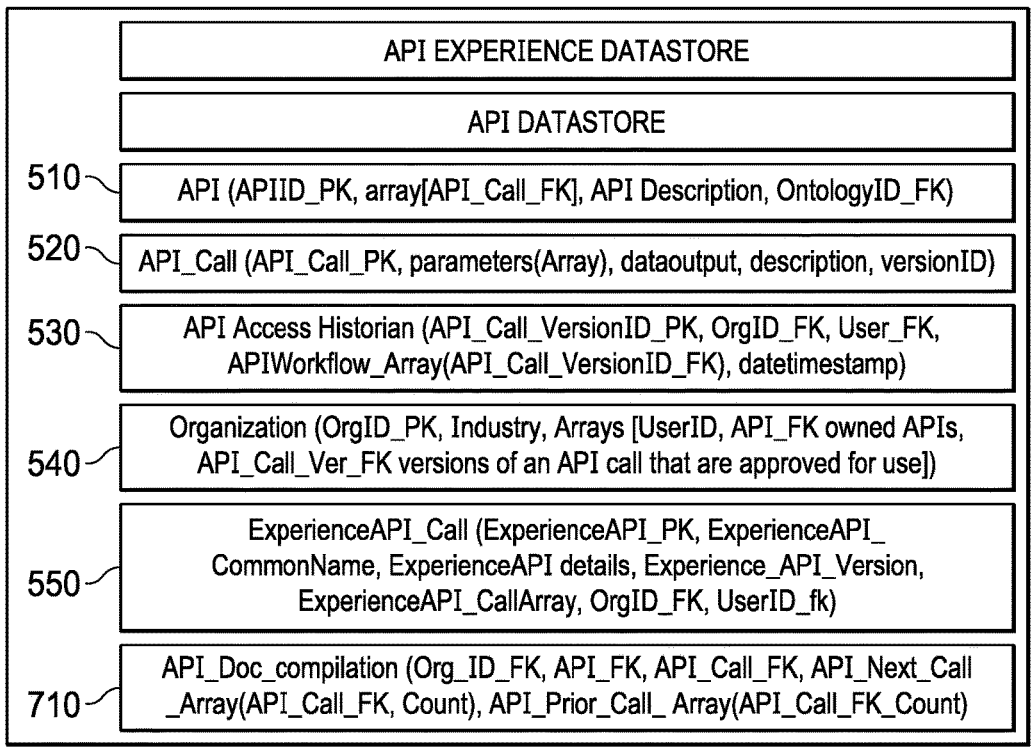
FIG. 7 shows a block diagram of customer documentation application program interface data structure.

FIG. 7 shows a block diagram of customer documentation application program interface data structure 700. In various embodiments, the documentation application program interface data structure 700 is stored within the API documentation datastore 462. In various embodiments, the customer documentation application program interface data structure 500 includes one or more of the API portion 510, the API call portion 520, the API access historian portion 530, the organization portion 540 and the experience API call portion 550. In various embodiments, the customer documentation application program interface data structure 700 includes an API documentation compilation portion 710.

In various embodiments, the API documentation compilation portion 710 includes one or more of an organization identification component (Org_ID_FK) which stores organization information regarding the API associated with the API documentation, an API component (API_FK) which stores the API associated with the API documentation, an API call component (API_Call_FK) which stores the API call associated with the documentation, an API next call array (API_Next_Call_Array(API_Call_FK_Count) which stores an array of next calls associated with the API associated with the documentation, an API prior call array (API Prior Call Array(API_Call_FK_Count) which stores an array of prior calls associated with the API associated with the documentation. In various embodiments, information contained within one or both of the API next call array and the API prior call array can be obtained from the API workflow array generated by an API access historian (such as the API historian engine 410) and stored within the API access historian portion 530.

Figure 8:
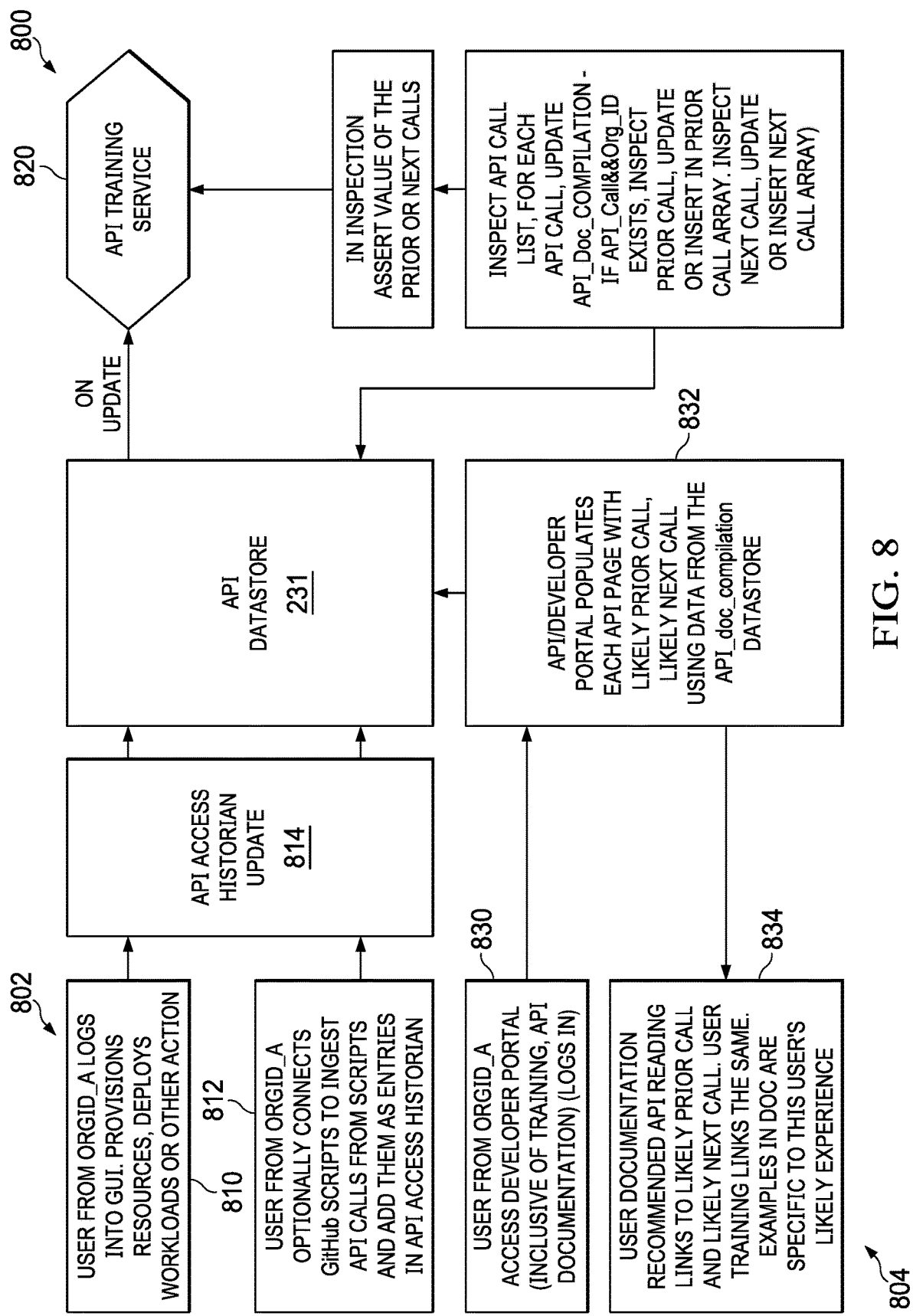
FIG. 8 shows a flow chart of the operation of a customer documentation application program interface operation.

FIG. 8 shows a flow chart of the operation of a customer documentation application program interface operation 800. In certain embodiments, the customer documentation application program interface operation 800 includes a historian update portion 802 and a documentation generation portion 804. In certain embodiments, the customer documentation application program interface operation 800 is associated with the API documentation generation operation performed by the API documentation engine 430.

The historian update portion 802 of the customer documentation application program interface operation 800 beings at step 810 when a user from a particular organization (e.g., Organization A) accesses a data center monitoring and management console 118 such as via a monitoring and management application 238 and performs an action. Examples of actions that could be performed include provisioning a resource or deploying a workload. Next, at step 812, the user can optionally provide scripts, such as GitHub scripts, to the data center monitoring and management console 118. The data center monitoring and management console 118 can then ingest these scripts. These scripts can then be added to the API datastore 231. In certain embodiments, the scripts are added to the historian API datastore 460 at step 814. When the API datastore 231 is updated, an API training service 820 is invoked. The API training service 820 inspects the API call list and for each API call updates the API documentation compilation. If an API call and organization identifier exists, the API training service inspects the prior call, updates or inserts the new information in the prior call array (such as the API Prior Call array stored within the API documentation compilation portion 710), inspects the next call and updates or inserts the new information in the next call array (such as the API Next Call array stored within the API documentation compilation portion 710). In certain embodiments, the inspection includes review by a user, be it the user that is from the organization or a user that is associated with the operation of the data center monitoring and management console 118.

The documentation generation portion 804 of the customer documentation application program interface operation 800 beings at step 830 when a user from the organization accesses a developer portal (such as the monitoring and management application 238. In various embodiments, the developer portal includes a training API documentation function. Next, at step 832 the developer portal populates each API page with likely prior calls, likely next calls using the data from the historian API datastore 460 portion of the API datastore 231. Next at step 834, user documentation is automatically generated for this particular user of this organization based upon the likely prior calls and likely next calls. In certain embodiments, the user documentation includes recommended API training links. In certain embodiments, the recommended API training links are specific to this user's likely experience.

Figure 9:
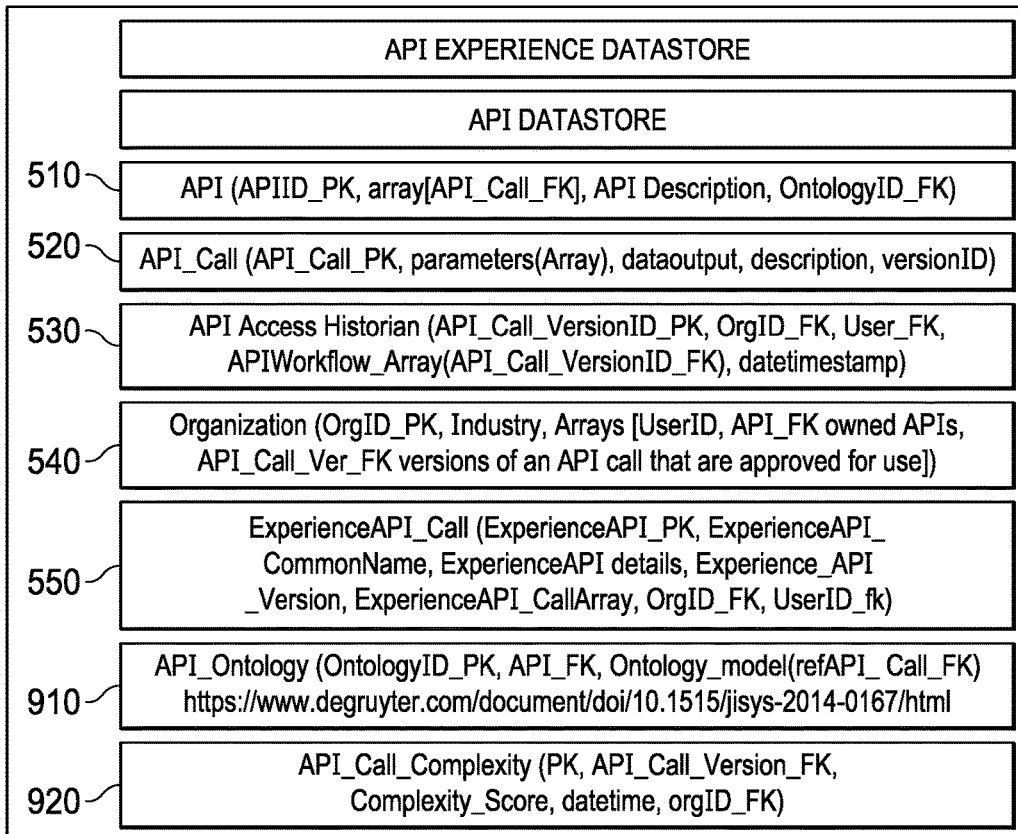
FIG. 9 shows a block diagram of an application program interface scoring data structure.

FIG. 9 shows a block diagram of an application program interface scoring data structure 900. In various embodiments, the application program interface scoring data structure is stored within the API scoring datastore 466. In various embodiments, the application program interface scoring data structure 900 includes one or more of the API portion 510, the API call portion 520, the API access historian portion 530, the organization portion 540 and the experience API call portion 550. In various embodiments, the application program interface scoring data structure 900 includes an API ontology portion 910 and an API call complexity portion 920.

In various embodiments, the API ontology portion 910 includes one or more of an ontology identification component (OntologyID_PK) which store ontology identification information regarding the API associated with the score, an API component (API_FK) which stores the API associated with score, an otology model component (Ontology model (refAPI_Call_FK) which stores an ontology model of the API. In various embodiments, the API call complexity portion 920 includes one or more of a primary key component (PK) which provides a unique identifier for the associated API, an API call version component (API_Call_Version_FK) which stores information regarding the version of the API call associated with the score, a complexity score component (Complexity Score) which stores a complexity score for the associated API call, a date and time component (datetime) which stores a date and time the score was generated for the associated API and an organization identification component (orgID_FK) which stores organization identification information for the API call associated with the score.

FIG. 10 shows a flow chart of the operation of an application program interface scoring operation 1000. More specifically, a complexity rules component 1010 accesses the API datastore 231. In certain embodiments, the complexity rules component 1010 retrieves an API and performs an API complexity operation on the API. As used herein, an API complexity operation analyzes an API call and generates a numerical API complexity score which reflects the complexity of the API. Additionally, when an API is updated, a complexity service component 1020 is called and interacts with the complexity rules component 1010 to update the complexity score for the API.

In certain embodiments, the complexity rules component 1010 applies default complexity rules when performing the API complexity operation. In certain embodiments, the default complexity rules are additive. In certain embodiments, the complexity rule takes into account one or more of whether an API call exists in an ontology, a number of API call parameters, a size of the data output of the API call, and a workflow of the API call. In certain embodiments, the API complexity score is increased by 25 when an API call exists in an ontology, the API complexity score is increased by 25 minus the number of API call parameters, the API complexity score is increased by 25 minus a number of lines returned by the API, the API complexity score is increased by 25 minus an average number of prior calls, minus an average number of post calls. For example, an API call that is a member of an ontology with five parameters and a five line output that can be used without prior or following calls would have an API complexity score of 90 (25 for being a member of an ontology +20 for the API call parameters, +20 for the size of the data output +25 not having any prior calls or post calls). In certain embodiments, custom rules can be developed which can be used to generate complexity scores according to the customer rules. In certain embodiments, the customer rules can be organization specific and the complexity scores are organization specific complexity scores.

In certain embodiments, the complexity rules are used identify low complexity APIs, medium complexity APIs and high complexity APIs. In certain embodiments, a low complexity API has an API complexity score greater than 75, a medium complexity API has an API complexity score between 40 and 74 and a high complexity API has an API complexity score less than 40.

FIG. 11 shows a block diagram of the operation of an application program interface scoring operation 1100. In certain embodiments, the API complexity scores can take into account an estimated complexity 1110. In certain embodiments, the API complexity scores can take into account an expected time to complete execution of an API 1120. In certain embodiments, the API complexity scores can take into account onboarding information 1130 such as a percentage of users who complete execution of the API in the expected time to complete execution. In certain embodiments, the API complexity scores can take into account user experience information 1140 such as a percentage of users who abandon execution of the API without completing execution of the API. In certain embodiments, one or more of the estimated complexity, the expected time to complete execution, the onboarding information and the user experience information can be used to calculate an actual complexity of the API 1150.

When complexity scores are associated with APIs, this information can be stored within an API portal along with documentation relating to the API. In certain embodiments, the API portal is stored within an API datastore such as datastore 231. When complexity scores are associated with the APIs, this information can be used to filter which APIs might be appropriate for a particular user. For example, a less experienced user might only have access to lower complexity APIs. Complexity scores could also be used within an API marketplace where pricing is based upon the complexity of the API. The complexity scores can also be used to recommend solutions to developers based on their experience level or timeline to complete a project.

Additionally, in certain embodiments, micro feedback can be used to establish whether a calculated complexity matches a user experience. In certain embodiments, this information could be filtered by persona skill level. In certain embodiments, the micro feedback could include one or more of the estimated complexity, the expected time to complete execution, the onboarding information and the user experience information can be used to calculate an actual complexity.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    monitoring an interaction of a user with a data center monitoring and management console when configuring an aspect of data center infrastructure, the configuring being performed via a plurality of application program interfaces, the monitoring being performed via an application program interface management engine of the data center monitoring and management console;
    analyzing the plurality of application program interfaces used when configuring the aspect of data center infrastructure, the analyzing being performed via the application program interface management engine of the data center monitoring and management console; and,
    generating a customer specific application program interface based upon the monitoring and the analyzing, the generating the customer specific application program interface being performed via the application program interface management engine of the data center monitoring and management console.

2. The method of claim 1, wherein:
the monitoring and analyzing are preformed via an application program interface historian operation, the application program interface historian operation being performed via an application program interface historian engine.

3. The method of claim 2, wherein:
the monitoring records application program interface calls made when configuring the data center infrastructure.

4. The method of claim 3, wherein:
the analyzing identifies input parameters for each of the plurality of application program interfaces and output parameters for each of the plurality of application program interfaces.

5. The method of claim 1, wherein:
the customer specific application program interface includes an experience application program interface.

6. The method of claim 5, wherein:
the experience application program interface combines aspects of the plurality of application program interfaces to achieve a predefined objective.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
    monitoring an interaction of a user with a data center monitoring and management console when configurating an aspect of data center infrastructure, the configuring being performed via a plurality of application program interfaces, the monitoring being performed via an application program interface management engine of the data center monitoring and management console;
    analyzing the plurality of application program interfaces used when configuring the aspect of data center infrastructure, the analyzing being performed via the application program interface management engine of the data center monitoring and management console; and,
    generating a customer specific application program interface based upon the monitoring and the analyzing, the generating the customer specific application program interface being performed via the application program interface management engine of the data center monitoring and management console.

8. The system of claim 7, wherein:
the monitoring and analyzing are preformed via an application program interface historian operation, the application program interface historian operation being performed via an application program interface historian engine.

9. The system of claim 8, wherein:
the monitoring records application program interface calls made when configuring the data center infrastructure.

10. The system of claim 9, wherein:
the analyzing identifies input parameters for each of the plurality of application program interfaces and output parameters for each of the plurality of application program interfaces.

11. The system of claim 7, wherein:
the customer specific application program interface includes an experience application program interface.

12. The system of claim 7, wherein:
the experience application program interface combines aspects of the plurality of application program interfaces to achieve a predefined objective.

13. A non-transitory, computer-readable storage medium embodying computer program code, the computer program code comprising computer executable instructions configured for:
monitoring an interaction of a user with a data center monitoring and management console when configurating an aspect of data center infrastructure, the configuring being performed via a plurality of application program interfaces, the monitoring being performed via an application program interface management engine of the data center monitoring and management console;
analyzing the plurality of application program interfaces used when configuring the aspect of data center infrastructure, the analyzing being performed via the application program interface management engine of the data center monitoring and management console; and,
generating a customer specific application program interface based upon the monitoring and the analyzing, the generating the customer specific application program interface being performed via the application program interface management engine of the data center monitoring and management console.

14. The non-transitory, computer-readable storage medium of claim 13, wherein:
the monitoring and analyzing are preformed via an application program interface historian operation, the application program interface historian operation being performed via an application program interface historian engine.

15. The non-transitory, computer-readable storage medium of claim 14, wherein:
the monitoring records application program interface calls made when configuring the data center infrastructure.

16. The non-transitory, computer-readable storage medium of claim 15, wherein:
the analyzing identifies input parameters for each of the plurality of application program interfaces and output parameters for each of the plurality of application program interfaces.

17. The non-transitory, computer-readable storage medium of claim 13, wherein:
the customer specific application program interface includes an experience application program interface.

18. The non-transitory, computer-readable storage medium of claim 17, wherein:
the experience application program interface combines aspects of the plurality of application program interfaces to achieve a predefined objective.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *